(12) United States Patent  
Janmey

(10) Patent No.: US 6,251,536 B1
(45) Date of Patent: Jun. 26, 2001

(54) ELECTROCHEMICAL CELL HAVING BEADED CAN

(75) Inventor: Robert M. Janmey, Omsted Township, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/395,651

(22) Filed: Sep. 14, 1999

(51) Int. Cl.$^7$ .................................................. H01M 2/02
(52) U.S. Cl. .......................... 429/176; 429/174; 429/175
(58) Field of Search ................... 429/175, 174, 429/164, 176

(56) References Cited

U.S. PATENT DOCUMENTS

| 3,648,884 | * | 3/1972 | Mansolino . | |
|---|---|---|---|---|
| 4,689,108 | * | 8/1987 | Barry, Jr. et al. . | |
| 5,332,633 | * | 7/1994 | Adamson et al. . | |
| 5,422,201 | | 6/1995 | Georgopoulos | 429/170 |
| 5,667,912 | | 9/1997 | Georgopoulos | 429/170 |
| 5,776,631 | | 7/1998 | Wu | 429/171 |
| 5,830,594 | * | 11/1998 | Malay . | |
| 5,932,371 | | 8/1999 | Tucholski | 429/185 |
| 6,007,936 | * | 12/1999 | Iwase et al. . | |
| 6,022,635 | * | 2/2000 | O'Hara, III et al. . | |

FOREIGN PATENT DOCUMENTS

| 788176 | * | 8/1997 | (EP) . |
|---|---|---|---|
| 10-083800 | * | 6/1998 | (JP) . |

OTHER PUBLICATIONS

Search Report Dec. 2000 PCT.*

* cited by examiner

Primary Examiner—John S. Maples
(74) Attorney, Agent, or Firm—Russell H. Toye, Jr.; Robert W. Welsh

(57) ABSTRACT

An electrochemical cell having a container with a closed bottom end, an open top end, and side walls extending between the bottom and top ends. The container has a plurality of beads extending radially inward formed near the open top end. Electrochemically active material is disposed in the container, and a seal assembly is disposed in the open end and supported by the plurality of beads.

10 Claims, 2 Drawing Sheets

ELECTROCHEMICAL CELL HAVING BEADED CAN

BACKGROUND OF THE INVENTION

The present invention generally relates to electrochemical cells and, more particularly, to a beaded can for supporting the collector and seal assembly in an electrochemical cell, i.e., battery, and method of forming the same.

Conventional alkaline electrochemical cells generally include a steel cylindrical can having a positive electrode, commonly referred to as the cathode, which often comprises manganese dioxide as the active material. The electrochemical cell also includes a negative electrode, commonly referred to as the anode, which often comprises zinc powder as the active material. Conventional cells often employ a bobbin-type construction in which the anode is centrally located and is surrounded by a tubularly shaped cathode. A separator is generally located between the anode and the cathode, and an alkaline electrolyte solution simultaneously contacts the anode, the cathode, and the separator. A conductive current collector is typically inserted into the anode active material, and a seal assembly, which includes an annular polymeric, seal such as nylon, provides closure to the open end of the steel can to seal the active electrochemical materials in the can.

The conventional steel can has a closed bottom end, an open top end, and cylindrical side walls extending between the top and bottom ends. The open top end of the can typically has a flared or otherwise enlarged opening, and some cans have a continuous bead formed in the can's side walls at a location sufficient to support the collector and seal assembly. Conventional cells are generally sealed closed by disposing the annular polymeric seal in the open top end of the steel can so that the seal rests on top of the bead, and crimping the open top end of the can radially inward and over the outer periphery of the seal and an outer cover to compress the seal and outer cover against the bead. The bead therefore provides support for the can crimping process and also controls collector movement.

In conventional cell assemblies, the bead is formed in the can's side walls as an approximate U-shaped channel extending radially inward throughout a complete 360 degree rotation of the can, such that the bead is symmetric about the longitudinal axis of the can. In conventional cell assembly processes, the continuous bead is formed by rotating the can through a 360 degree rotation while, at the same time, forcibly forming the radially inward bead in the can wall with the use of rotary beading equipment. The conventional rotary beading equipment is generally costly and time-consuming to build, maintain, and use. Accordingly, it is therefore desirable to provide for a can that has a collector and seal assembly support for use in an electrochemical cell that offers reduced cost and is quicker to produce.

SUMMARY OF THE INVENTION

The present invention provides an easy to manufacture can with beaded support for the collector and seal assembly in an electrochemical cell. To achieve this and other advantages, and in accordance with the purpose of the invention as embodied and described herein, the present invention, according to one aspect, provides for an electrochemical cell having a container with a closed bottom end, an open top end, and side walls extending between the top and bottom ends. The container has a plurality of beads formed in the side walls and extending radially inward for supporting a seal assembly. The cell further includes electrochemically active materials, including a positive electrode and a negative electrode, disposed in the container. A seal member is disposed in the open top end of the container and is supported by the plurality of beads for closing the open top end of the container.

According to another aspect of the present invention, a method for assembling an electrochemical cell is provided which includes the steps of providing a container having a closed bottom end, an open top end, and upstanding side walls extending between the closed bottom end and the open top end, disposing electrochemically active materials including positive and negative electrodes in the container, forming in the upstanding wall of the container a plurality of beads extending radially inward, disposing a seal member in the open top end of the container against the plurality of beads, and closing the open top end of the container.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
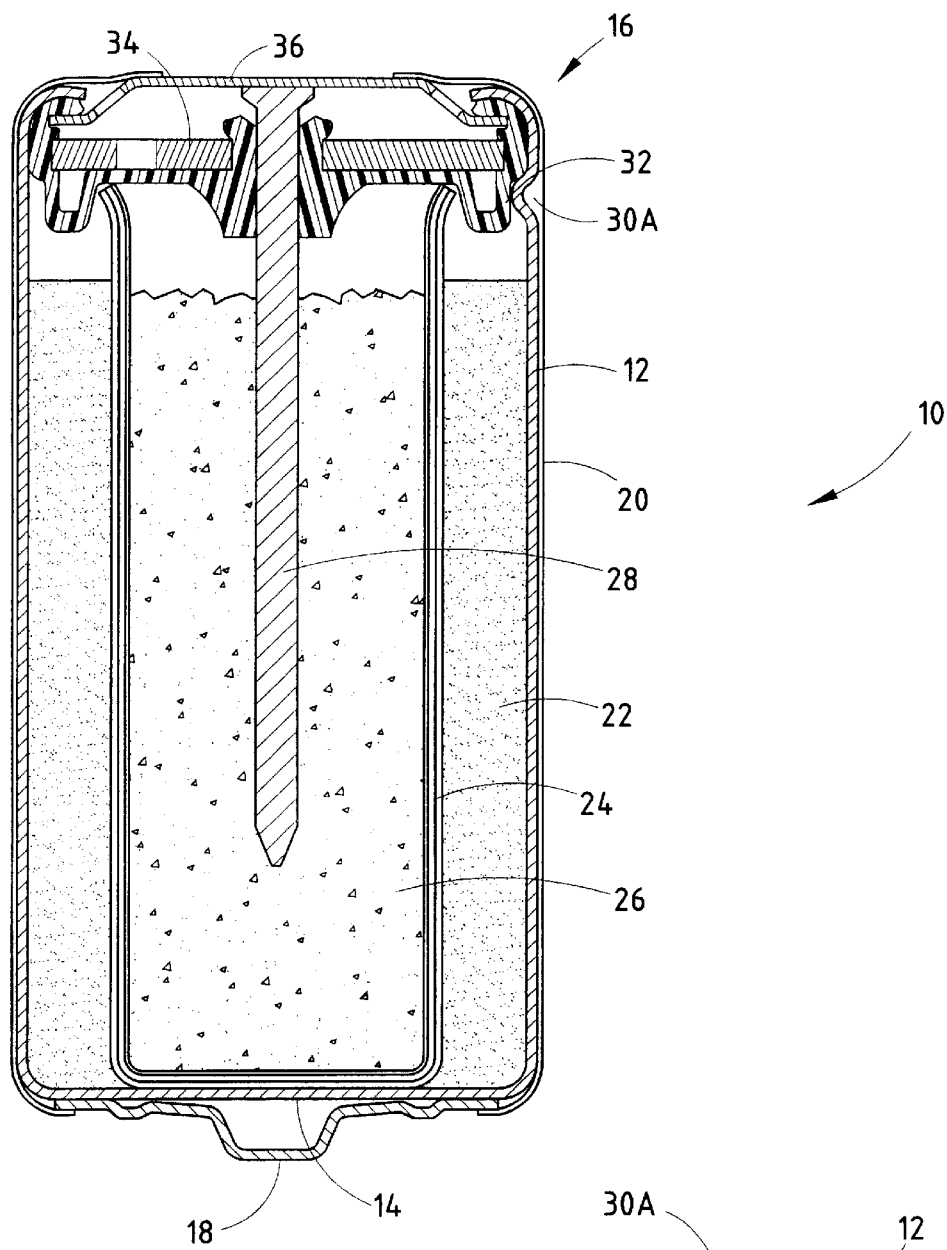
FIG. 1 is a longitudinal cross-sectional view of an electrochemical cell having a beaded can according to one embodiment of the present invention.

Referring to FIG. 1, a cylindrical electrochemical cell 10, such as an alkaline cell according to one example, is shown therein. Electrochemical cell 10 includes a cylindrical steel can 12 having a closed bottom end 14, an open top end 16, and cylindrical side walls extending between the top and bottom ends. The closed bottom end 14 of steel can 12 further includes a positive cover 18 welded or otherwise attached thereto and formed of plated steel, with a protruding nub at its center region, which forms the positive contact terminal of cell 10. A metalized, plastic film label 20 is formed about the exterior surface of steel can 12, except for the ends of steel can 12. Film label 20 may be formed over the peripheral edge of the positive cover 18 and may extend partially onto the negative cover as shown.

A tubular shaped cathode 22 is formed about the interior surface of steel can 12 and contacts can 12. According to one example, the cathode 22 comprises a mixture of manganese dioxide, graphite, potassium hydroxide solution, and additives. A separator 24, which may include a cup-shaped separator, preferably formed of a non-woven fabric that prevents migration of any solid particles in the cell 10, is disposed about the interior surface of cathode 22. An anode 26 is disposed with electrolyte inside the separator 24, generally in the center of the cell 10. According to one example, the anode 26 is preferably formed of zinc powder, a gelling agent, and additives. Disposed in contact with the anode 26 is a current collector 28, which may include a brass nail having an elongated body and an enlarged head at one end. Accordingly, the cathode 22 is configured as the cell's positive electrode, and the anode 26 is configured as the cell's negative electrode. While a bobbin type cell construction is shown, the anode 26, cathode 22, and separator 24 may alternately be configured in a spiral wound configuration for a jelly-roll cell construction, or otherwise configured for either primary or secondary cells, without departing from the teachings of the present invention.

The electrochemical cell 10 further includes a collector and seal assembly which seals closed the open end 16 of steel can 12. Included in the collector and seal assembly is the current collector 28, an annular polymeric seal 32 preferably of nylon, and an inner metal cover 34. The current collector 28, nylon seal 32, and inner cover 34 may be pre-assembled and inserted into the open end 16 of steel can 12 as an assembled unit. The inner cover 34, which is preferably formed of a rigid metal, is provided to increase the rigidity and support the radial compression of nylon seal 32, thereby improving the sealing effectiveness. The inner cover 34 is configured to contact the seal's inner upstanding wall at the central hub and the outer peripheral upstanding wall of seal 32. The current collector 28 contacts an outer negative cover 36 which forms the negative contact terminal of cell 10. The outer negative cover 36 is preferably formed of plated steel, and may be held in contact with current collector 28 via pressure contact or a weld. The outer negative cover 36 and inner cover 34 both have one or more vent openings, i.e., apertures, formed therein for allowing the release of pressurized gases during a cell venting condition.

The steel can 12 is formed to include a plurality of radially inwardly extending beads 30A–30C formed in the side walls of can 12, near the open top end 16, to provide support for the nylon seal 32. According to the present invention, each of the can beads 30A–30C is formed as a non-continuous, i.e., segmented, bead. The steel can 12 preferably includes at least three beads 30A–30C formed at the same elevation in can 12 to provide at least three contact points which serve as a stable support for seal 32. According to the preferred embodiment, steel can 12 has three beads 30A–30C formed in circumferentially spaced positions, e.g., every 120 degrees, about the side walls of steel can 12. It should be appreciated that less than three segmented beads could be used, provided there exists at least three supporting contact points to provide support for seal 32.

Figure 2:
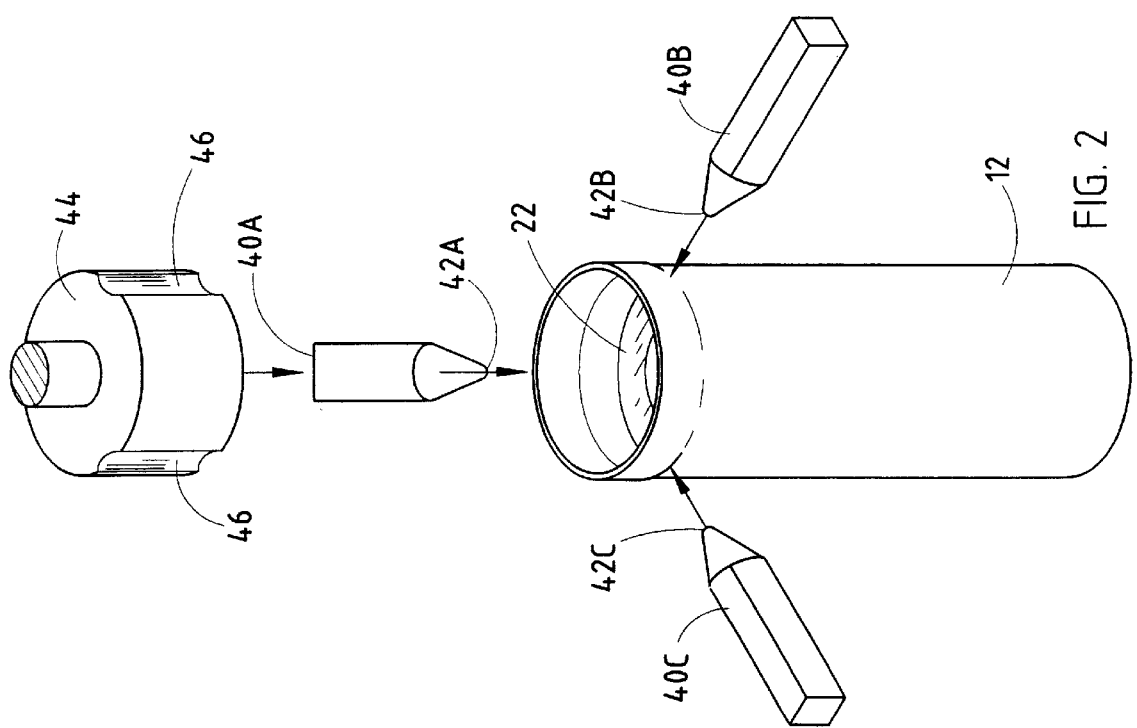
FIG. 2 is an elevated perspective view of the cell's steel can prior to forming the plurality of beads.

The plurality of radially inward beads 30A–30C are advantageously formed in the side walls of steel can 12 by simultaneously contacting steel can 12 with a triple action collet press having three radial press members 40A–40C, as shown in FIG. 2. Radial press members 40A–40C include contact tips 42A–42C, respectively. Contact tips 42A–42C are configured to provide the desired shape of the corresponding beads to be formed in steel can 12. According to one example, contact tips 42A–42C have a semi-spherical shape to form the can beads 30A–30C in a rounded configuration, which generally appear as recessed dots. Radial press members 40A–40C are preferably circumferentially spaced which, for the three bead embodiment, requires an angular separation of 120 degrees between adjacent press members about the side walls of steel can 12.

In addition, an internal support rod 44 is employed to provide structural support on the inside walls of steel can 12 during the bead forming process. Internal support rod 44 has cylindrical side walls that substantially match the inner walls near the open end of steel can 12. Formed in support rod 44 are a number of contoured receptacles 46, such as slots, that are configured to receive the press tips 42A–42C, and aligned with press members 40A–40C. The internal support member 44 extends partially into the open end of can 12, to provide localized support on the inside walls of can 12, near the open top end 16. The receptacles 46 serve to shape the contour of the beads, to contain the bead formations to a localized pattern, and also serve to limit the travel of the radial press members 40A–40C.

Figure 3:
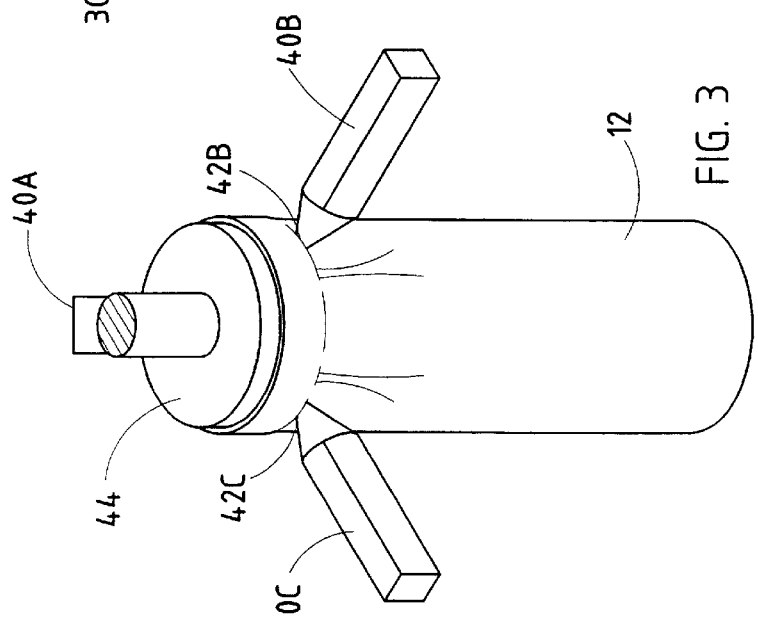
FIG. 3 is an elevated perspective view of the steel can during the can beading process.

Referring to FIG. 3, the three radial press members 40A–40C are shown simultaneously actuated radially inward and forcibly contacting the outer walls of steel can 12 during the bead forming process. At the same time, the internal support rod 44 is lowered partly into the open end of steel can 12. As shown, press member 40A is urged against the side walls of steel can 12 to forcibly cause the indentation of a radially inward bead 30A having the shape defined by contact tip 42A and receptacle 46. Press members 40B and 40C likewise form beads 30B and 30C, respectively. Beads 30A–30C are preferably formed to a depth of at least 10 mils, and more preferably to a depth in the range of 10–25 mils. Upon completing the formation of the plurality of beads 30A–30C, the press members 40A–40C are simultaneously moved radially outward from can 12, and the internal support rod 44 is raised out of the open top end of the can 12.

Figure 5:
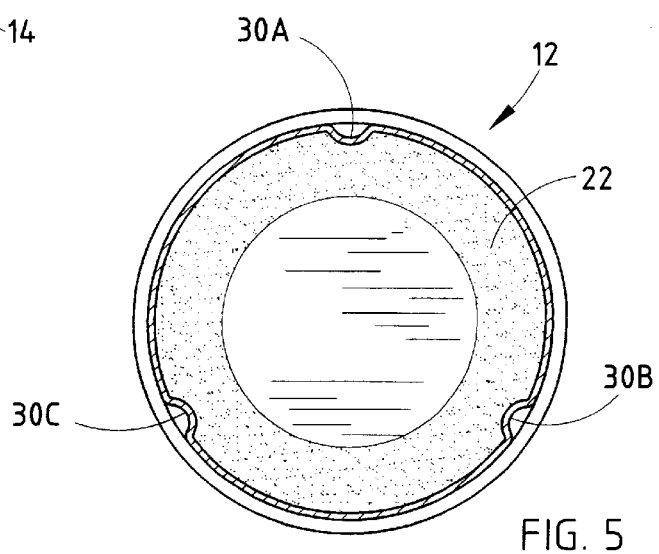
FIG. 5 is a top view of the beaded steel can shown in FIG. 4.
Figure 4:
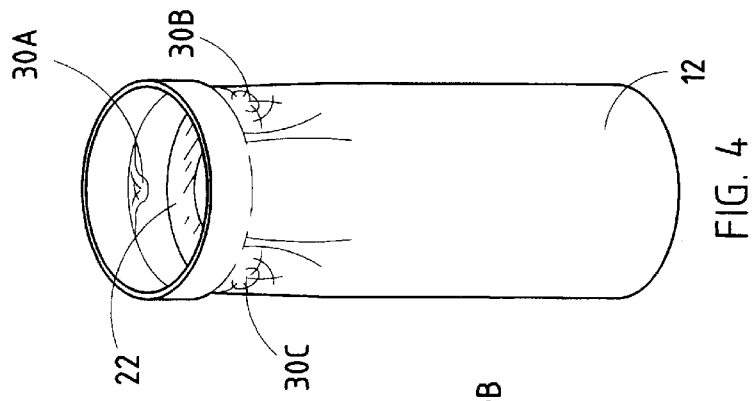
FIG. 4 is an elevated perspective view of the steel can with the plurality of beads formed in the cell walls near the open end.

The steel can 12 formed with beads 30A–30C is further shown in FIGS. 4 and 5. The plurality of beads 30A–30C are preferably formed in steel can 12 subsequent to the formation of the cathode 22. The cathode 22 may be formed in a tubular shape in can 12 using ring molding techniques or impact molding techniques, as is generally known in the battery art. After the cathode formation, the can 12 is preferably reshaped with the plurality of beads 30A–30C, and thereafter the separator 24 and anode 26 are disposed in the can 12. It should be appreciated that the plurality of beads 30A–30C could be formed in steel can 12 prior to insertion and formation of the cathode, without departing from the teachings of the present invention. Once the internal components of the cell 10 are disposed in the steel can 12, and the beads 30A–30C are formed in the can side walls, the collector and seal assembly is placed in the open end of the can such that seal 32 rests on top of beads 30A–30C. The outer cover 36 is disposed over the seal assembly, and the open top end of can 12 may be closed by crimping the open top end of the can 12 radially inward and over the outer periphery of the seal 32 to compress the outer cover 36 and seal 32 against the beads 30A–30C. The beads 30A–30C thereby provide stable support for the collector and seal assembly, as well as control the collector movement.

Accordingly, a plurality of non-continuous beads 30A–30C are formed in steel can 12 using a simplified bead formation technique with a triple action radial press, in lieu of more expensive rotary bead forming equipment. By providing at least three inward beads 30A–30C, the nylon seal 32 is held in place in a stable position. While three small beads 30A–30C are shown and described herein, it should be appreciated that a larger number of beads may be formed in the steel can 12 using the technique disclosed herein. In addition, it should also be appreciated that an alternately shaped plurality of elongated beads may be formed in the side wall of steel can 12, and the steel can 12 may be configured in various shapes such as cylindrical, rectangular, polygonal, etc.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container having a closed bottom end, an open top end, and side walls extending between the bottom and top ends, said container further having a plurality of beads formed in said side walls and extending radially inward to provide support for a seal assembly;
   electrochemically active materials disposed in said container, said electrochemical active materials including a positive electrode and a negative electrode; and
   a seal member disposed in the open top end of said container and resting on top of said plurality of beads for closing the open top end of said container.

2. The electrochemical cell as defined in claim 1 further comprising a cover disposed on top of said seal member in said open top end of said container, wherein said side walls at said open top end of said container are radially crimped inward to close said open top end.

3. The electrochemical cell as defined in claim 1, wherein said plurality of beads are formed near said open top end of said container.

4. The electrochemical cell as defined in claim 1, wherein said plurality of beads comprises at least three beads.

5. The electrochemical cell as defined in claim 1, wherein said plurality of beads are simultaneously formed by a multiple action press having radially actuated press members.

6. The electrochemical cell as defined in claim 1, wherein each of said plurality of beads are formed by a press member radially actuated against the side walls of said container.

7. The electrochemical cell as defined in claim 1, wherein said can comprises a steel can.

8. The electrochemical cell as defined in claim 1, wherein said beads extend radially inward from said side walls to a depth of at least 10 mils.

9. The electrochemical cell as defined in claim 8, wherein said beads extend radially inward from said side walls to a depth in the range of 10 mil to 25 mil.

10. The electrochemical cell as defined in claim 1 further comprising a current collector extending through an opening formed in said seal member and contacting one of the positive and negative electrodes.

* * * * *